United States Patent
Kuwayama et al.

(10) Patent No.: US 10,626,936 B2
(45) Date of Patent: Apr. 21, 2020

(54) DISC BRAKE ROTOR

(71) Applicant: Shimano Inc., Sakai-shi, Osaka (JP)

(72) Inventors: Kazuya Kuwayama, Sakai (JP); Yusuke Hosomi, Sakai (JP); Natsuki Noma, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 0 days.

(21) Appl. No.: 16/015,099

(22) Filed: Jun. 21, 2018

(65) Prior Publication Data

US 2019/0032738 A1    Jan. 31, 2019

(30) Foreign Application Priority Data

Jul. 31, 2017    (DE) .................. 10 2017 117 256

(51) Int. Cl.
| | | |
|---|---|---|
| *F16D 65/12* | (2006.01) | |
| *B62L 1/00* | (2006.01) | |
| *F16D 65/02* | (2006.01) | |

(52) U.S. Cl.
CPC ............ *F16D 65/127* (2013.01); *B62L 1/005* (2013.01); *F16D 65/128* (2013.01); *F16D 2065/1316* (2013.01); *F16D 2065/1328* (2013.01); *F16D 2065/1392* (2013.01)

(58) Field of Classification Search
CPC .................. F16D 65/123–128; B62L 1/005
USPC ........ 188/18 A, 26, 218 XL, 264 A, 264 AA
See application file for complete search history.

(56) References Cited

U.S. PATENT DOCUMENTS

| | | | | |
|---|---|---|---|---|
| 7,424,938 | B2 * | 9/2008 | Takizawa ................ | B62L 1/005 188/18 A |
| 8,522,931 | B2 * | 9/2013 | Souwa .................... | F16D 65/12 188/18 A |
| 10,352,382 | B2 * | 7/2019 | Oi .......................... | F16D 65/127 |
| 2006/0037819 | A1 * | 2/2006 | Takizawa ................ | B62L 1/005 188/26 |
| 2010/0206675 | A1 * | 8/2010 | Miyake ................... | F16D 65/12 188/218 XL |
| 2012/0222926 | A1 * | 9/2012 | Iwai ....................... | F16D 65/123 188/218 XL |
| 2013/0112515 | A1 | 5/2013 | Shinagawa | |
| 2013/0168193 | A1 * | 7/2013 | Iwai ....................... | F16D 65/12 188/218 XL |
| 2017/0370431 | A1 * | 12/2017 | Dunlap .................. | F16D 65/125 |

FOREIGN PATENT DOCUMENTS

| | | |
|---|---|---|
| DE | 102011001504 A1 | 10/2011 |
| TW | M473983 U | 3/2014 |

\* cited by examiner

*Primary Examiner* — Christopher P Schwartz
(74) *Attorney, Agent, or Firm* — Alleman Hall Creasman & Tuttle LLP (57) ABSTRACT

A disc brake rotor for a small vehicle including a bicycle has an inner member configured to be coupled to a wheel of the small vehicle and an outer member outwardly provided with respect to the inner member in a radial direction of disc brake rotor. The outer member includes a brake surface, a pair of first through holes extending through the brake surface in an axial direction of the disc brake rotor, and a recess provided in the brake surface so as to be recessed in the axial direction at least between the pair of the first through holes.

29 Claims, 6 Drawing Sheets

DISC BRAKE ROTOR

BACKGROUND ART

The present invention relates to a disc brake rotor and, more particularly, to a disc brake rotor for a small vehicle including a bicycle.

One known method for applying the brake to a wheel of a bicycle or the like presses a brake pad against a disc brake rotor that rotates integrally with the wheel.

Through holes may be formed in the disc brake rotor to reduce the weight of the disc brake rotor. The disc brake rotor generates heat as it contacts the brake pad. Thus, the number and the area of the through holes will affect the cooling efficiency of the disc brake rotor.

It is an object of the present invention to provide a disc brake rotor having a high cooling efficiency.

SUMMARY

One aspect of the present invention is a disc brake rotor for a small vehicle including a bicycle. The disc brake rotor includes an inner member and an outer member. The inner member is configured to be coupled to a wheel of the small vehicle. The outer member is outwardly provided with respect to the inner member in a radial direction of disc brake rotor. The outer member includes a brake surface, a pair of first through holes extending through the brake surface in an axial direction of the disc brake rotor, and a recess provided in the brake surface so as to be recessed in the axial direction at least between the pair of the first through holes.

The outer member includes the recess. Thus, the outer member can efficiently dissipate the heat of the outer member from the recess while being configured to be light.

In accordance with a second aspect of the present invention, the disc brake rotor according to the first aspect is configured so that the recess is provided along an entire periphery of at least one of the pair of the first through holes.

Thus, the heat of the outer member can be further efficiently dissipated from the recess.

In accordance with a third aspect of the present invention, the disc brake rotor according to the second aspect is configured so that the recess is provided along an entire periphery of each of the pair of the first through holes.

Thus, the heat of the outer member can be further efficiently dissipated from the recess.

In accordance with a fourth aspect of the present invention, the disc brake rotor according to any one of the first to third aspects is configured so that the inner member includes a coupling portion extending toward the outer member in the radial direction, and the outer member includes a coupled portion coupled to the coupling portion.

Thus, the rigidity of the disc brake rotor can be improved.

In accordance with a fifth aspect of the present invention, the disc brake rotor according to the fourth aspect is configured so that the outer member is provided as a separate member with respect to the inner member. The disc brake rotor further includes a fastener coupling the coupled portion to the coupling portion.

Thus, the outer member and the inner member can be separately manufactured with preferred shapes from preferred materials. This facilitates the manufacturing of a disc brake rotor with a preferred shape from a preferred material.

In accordance with a sixth aspect of the present invention, the disc brake rotor according to the fourth or fifth aspect is configured so that the coupling portion is plurally provided on the inner member, and the coupled portion is plurally provided on the outer member. The disc brake rotor further includes a heat dissipating fin at least partially arranged between adjacent two of the coupling portions and/or adjacent two of the coupled portions in a circumferential direction of the disc brake rotor.

Thus, the heat dissipating fin dissipates the heat of the outer member and further improves the cooling efficiency.

In accordance with a seventh aspect of the present invention, the disc brake rotor according to the sixth aspect is configured so that the heat dissipating fin includes a second through hole extending through the heat dissipating fin in the axial direction.

Thus, the disc brake rotor can be configured to be further lighter.

In accordance with an eighth aspect of the present invention, the disc brake rotor according to the seventh aspect is configured so that the second through hole is provided so as to align with the first through holes in the radial direction.

Thus, the outer appearance of the disc brake rotor can be improved.

In accordance with a ninth aspect of the present invention, the disc brake rotor according to the seventh or eighth aspect is configured so that the second through hole has an opening area that is smaller than that of at least one of the pair of the first through holes.

Thus, the rigidity of the heat dissipating fin can be maintained.

In accordance with a tenth aspect of the present invention, the disc brake rotor according to any one of the first to ninth aspects is configured so that the brake surface includes a first brake surface facing toward one side in the axial direction, and a second brake surface facing toward another side in the axial direction. The recess includes a first recess and a second recess. The first recess is provided so as to be recessed in the first brake surface in the axial direction, and the second recess is provided so as to be recessed in the second brake surface in the axial direction.

The outer member includes the first recess and the second recess. This dissipates the heat of the outer member further efficiently.

In accordance with an eleventh aspect of the present invention, the disc brake rotor according to the tenth aspect is configured so that the outer member includes a first member including the first brake surface, a second member including the second brake surface, and an intermediate member arranged between the first member and the second member in the axial direction.

The shapes of the first member, the second member, and the intermediate member can be separately set. This facilitates the formation of the recess.

In accordance with a twelfth aspect of the present invention, the disc brake rotor according to the eleventh aspect is configured so that the first member includes a first material, the second member includes a second material, the intermediate member includes a third material, and the third material differs from the first material and the second material.

Thus, the degree of freedom is increased for selection of the properties of the disc brake rotor.

In accordance with a thirteenth aspect of the present invention, the disc brake rotor according to the twelfth aspect is configured so that the first material and the second material are the same.

Thus, costs can be reduced.

In accordance with a fourteenth aspect of the present invention, in the disc brake rotor according to any one of the eleventh to thirteenth aspects, the recess is at least partially configured by the intermediate member.

Thus, the influence of the formation of the recess on the shapes of the first member and the second member can be reduced.

In accordance with a fifteenth aspect of the present invention, the disc brake rotor according to any one of the eleventh to fourteenth aspects is configured so that the inner member is coupled to the outer member so that heat conduction from the outer member displaces the inner member toward one side in the axial direction, the first member has a first thickness in the axial direction, the second member has a second thickness in the axial direction, and the first thickness and the second thickness are set so as to displace the outer member toward another side in the axial direction as the outer member generates heat.

Thus, in a case where a large amount of heat is generated by the outer member as a result of contact with the brake pad and the brake surface, large bending of the disc brake rotor can be limited toward one side or another side in the axial direction.

In accordance with a sixteenth aspect of the present invention, the disc brake rotor according to the fifteenth aspect is configured so that the first thickness is greater than the second thickness.

Thus, the rigidity of the first member is increased.

In accordance with a seventeenth aspect of the present invention, the disc brake rotor according to the fifteenth or sixteenth aspect is configured so that the intermediate member has a third thickness in the axial direction, and the third thickness is greater than the first thickness and the second thickness.

Thus, the rigidity of the intermediate member is increased.

In accordance with an eighteenth aspect of the present invention, the disc brake rotor according to any one of the eleventh to seventeenth aspects is configured so that the outer member includes a heat dissipating fin at least partially configured by the intermediate member.

Thus, the intermediate member held between the first member and the second member can efficiency dissipate heat.

In accordance with a nineteenth aspect of the present invention, the disc brake rotor according to the eighteenth aspect is configured so that the heat dissipating fin includes a second through hole extending through the heat dissipating fin in the axial direction.

Thus, the disc brake rotor can be configured to be further lighter.

In accordance with a twentieth aspect of the present invention, the disc brake rotor according to the nineteenth aspect is configured so that the second through hole is provided so as to align with the first through hole in the radial direction.

Thus, the outer appearance of the disc brake rotor can be improved.

In accordance with a twenty-first aspect of the present invention, the disc brake rotor according to the nineteenth or twentieth aspect is configured so that the second through hole has an opening area that is smaller than that of at least one of the pair of the first through holes.

Thus, the rigidity of the heat dissipation fin can be maintained.

In accordance with a twenty-second aspect of the present invention, the disc brake rotor according to any one of the first to twenty-first aspects is configured so that the first through holes are arranged in a circumferential direction of the disc brake rotor.

Thus, heat dissipation can be advanced from surfaces extending in the circumferential direction in the recess.

In accordance with a twenty-third aspect of the present invention, the disc brake rotor according to any one of the first to twenty-first aspects is configured so that the first through holes are arranged in the radial direction.

Thus, heat dissipation can be advanced from surfaces extending in the radial direction in the recess.

In accordance with a twenty-fourth aspect of the present invention, the disc brake rotor according to any one of the first to twenty-third aspects is configured so that the first through holes are provided so as to be non-line-symmetric via to the recess.

Thus, the heat dissipation at a portion of the recess at a side toward one of the through holes can differ from the heat dissipation at a portion of the recess at a side toward the other one of the through holes.

In accordance with a twenty-fifth aspect of the present invention, the disc brake rotor according to any one of the first to twenty-fourth aspects is configured so that the outer member further includes a third through hole extending through the outer member in the axial direction.

Thus, the disc brake rotor can be configured to be further lighter.

In accordance with a twenty-sixth aspect of the present invention, the disc brake rotor according to the twenty-fifth aspect is configured so that the third through hole is provided so as to align with the first through holes in a circumferential direction of the disc brake rotor.

Thus, the outer appearance of the disc brake rotor can be improved.

In accordance with a twenty-seventh aspect of the present invention, the disc brake rotor according to the twenty-fifth or twenty-sixth aspect is configured so that the third through hole has an opening area that is smaller than that of at least one of the pair of the first through holes.

Thus, a suitable area can be maintained for the brake surface.

In accordance with a twenty-eighth aspect of the present invention, the disc brake rotor according to any one of the first to twenty-seventh aspects is configured so that the outer member includes a plurality of the pair of the first through holes.

Thus, the disc brake rotor can be configured further lightly.

In accordance with a twenty-ninth aspect of the present invention, the disc brake rotor according to the twenty-sixth aspect is configured so that the plurality of the pair of the first through holes are provided so as to align with one another in a circumferential direction of the disc brake rotor.

Thus, the outer appearance of the disc brake rotor can be improved.

The disc brake rotor according to the present invention improves the cooling efficiency.

EMBODIMENTS OF THE INVENTION

First Embodiment

Figure 1:
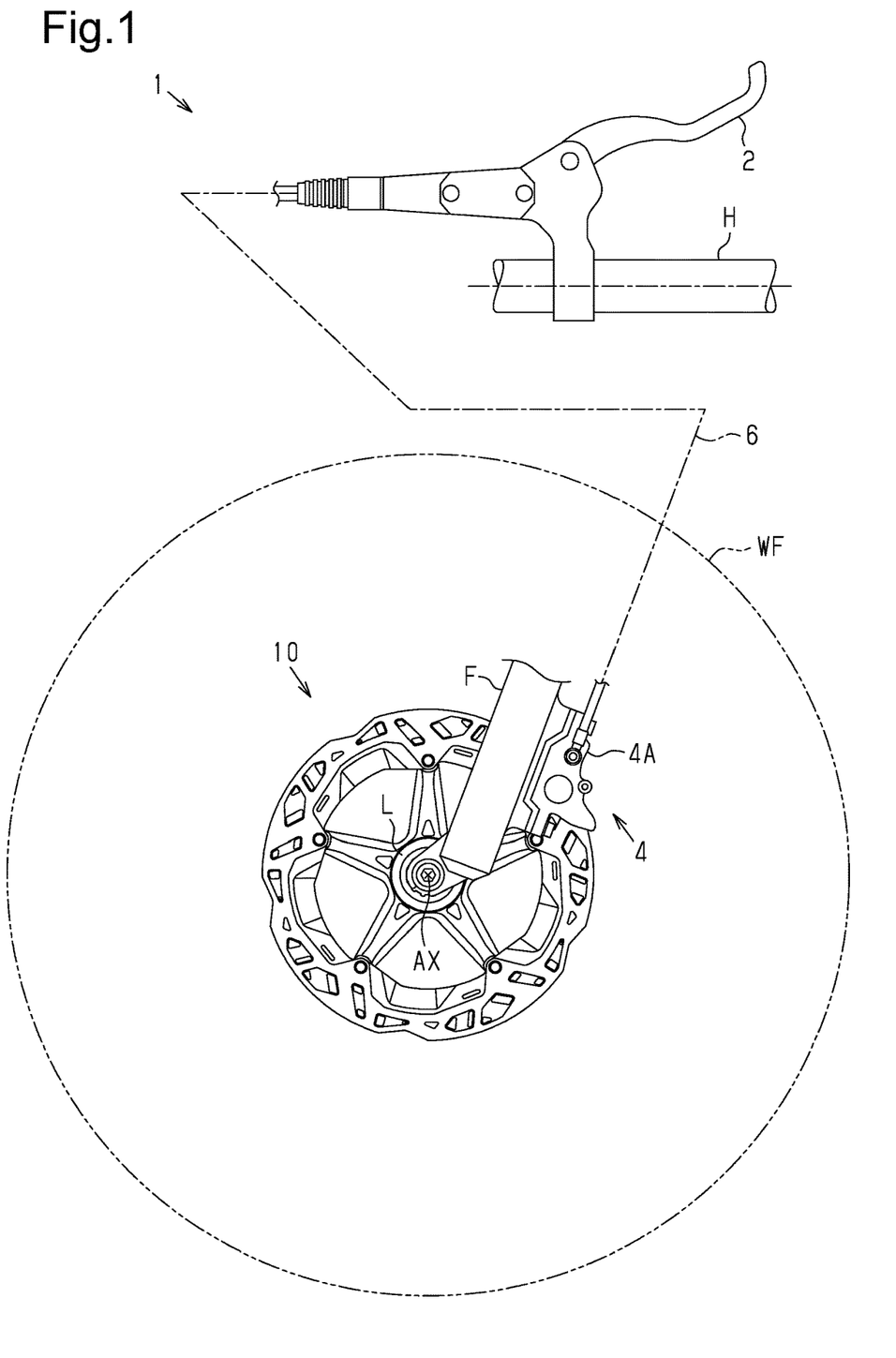
FIG. 1 is a schematic diagram of a disc brake system including a disc brake rotor according to a first embodiment.

A disc brake system 1 for a small vehicle including a bicycle will now be described with reference to FIG. 1. A small vehicle refers to a vehicle including a wheel driven by at least one of manual power and electric power.

The disc brake system 1 for a bicycle includes a disc brake rotor 10 according to one embodiment of the present invention. In this embodiment, the disc brake system 1 further includes an operation device 2, such as a brake lever, and a brake device 4. In this embodiment, the disc brake system 1 is a front brake system that brakes a front wheel WF of a bicycle.

The operation device 2 is provided on, for example, a handlebar H of a bicycle. The brake device 4 includes a caliper 4A and brake pads (not shown). The operation device 2 is hydraulically or mechanically connected to the caliper 4A by a hydraulic hose and a control cable functioning as a connection member 6. The brake device 4 is provided on, for example, a front fork F of the bicycle. The brake pads are provided on the caliper 4A to contact the disc brake rotor 10 in accordance with an input to the operation device 2.

The disc brake rotor 10 includes a rotation axis AX and is coupled to, for example, a hub shell (not shown) of the wheel WF by a fixing member such as a lock ring L. The rotation axis AX of the disc brake rotor 10 extends in an axial direction D1 of the disc brake rotor 10 (refer to FIG. 5). In a state where the bicycle is traveling, the disc brake rotor 10 rotates about the rotation axis AX together with the wheel WF. In accordance with an input to the operation device 2, the brake pads of the caliper 4A contact the disc brake rotor 10 to brake the rotation of the disc brake rotor 10 and brake the rotation of the wheel WF. The caliper 4A usually includes a pair of brake pads that hold the disc brake rotor 10 in between.

Figure 2:
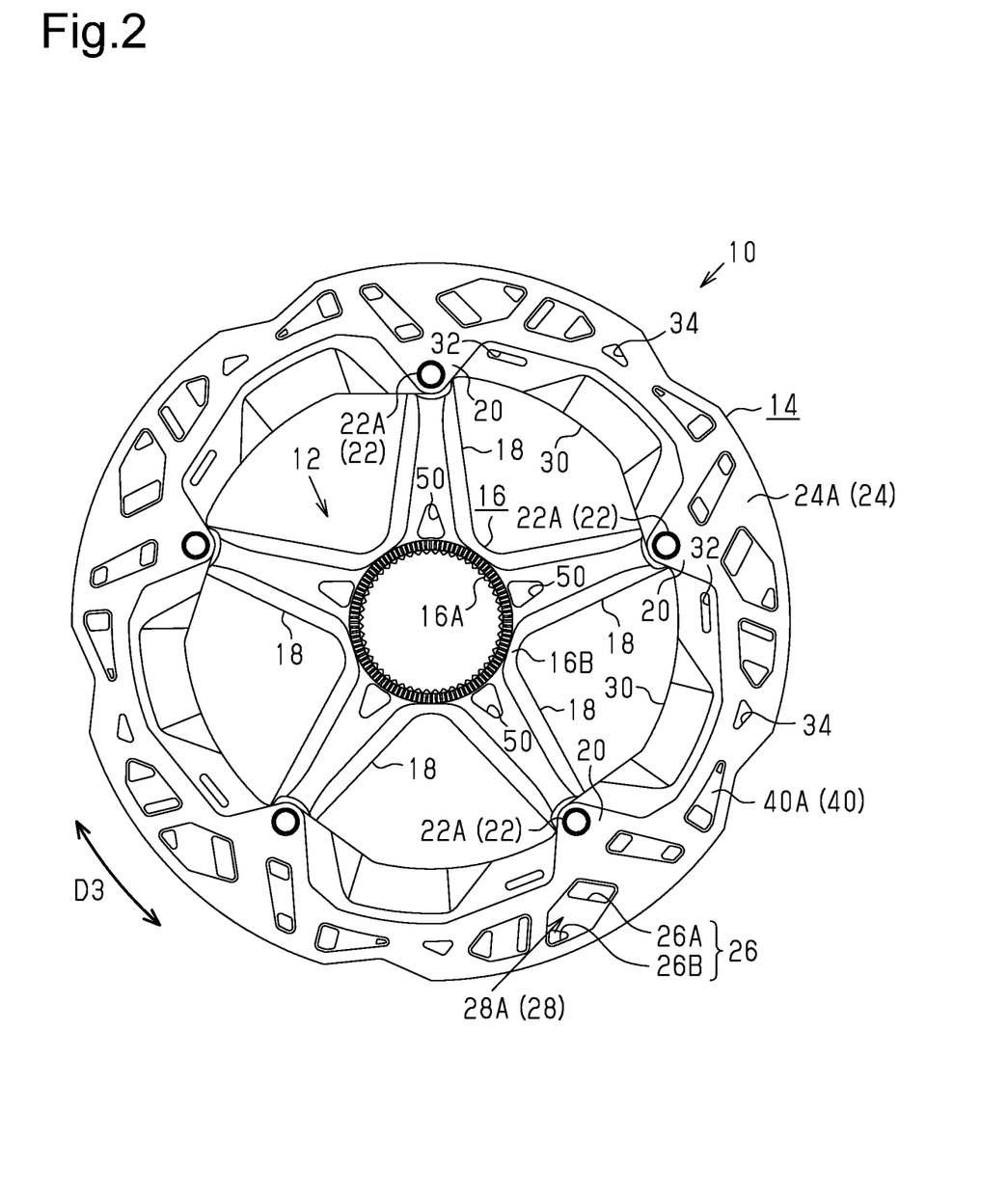
FIG. 2 is a side view of the disc brake rotor shown in FIG. 1.
Figure 3:
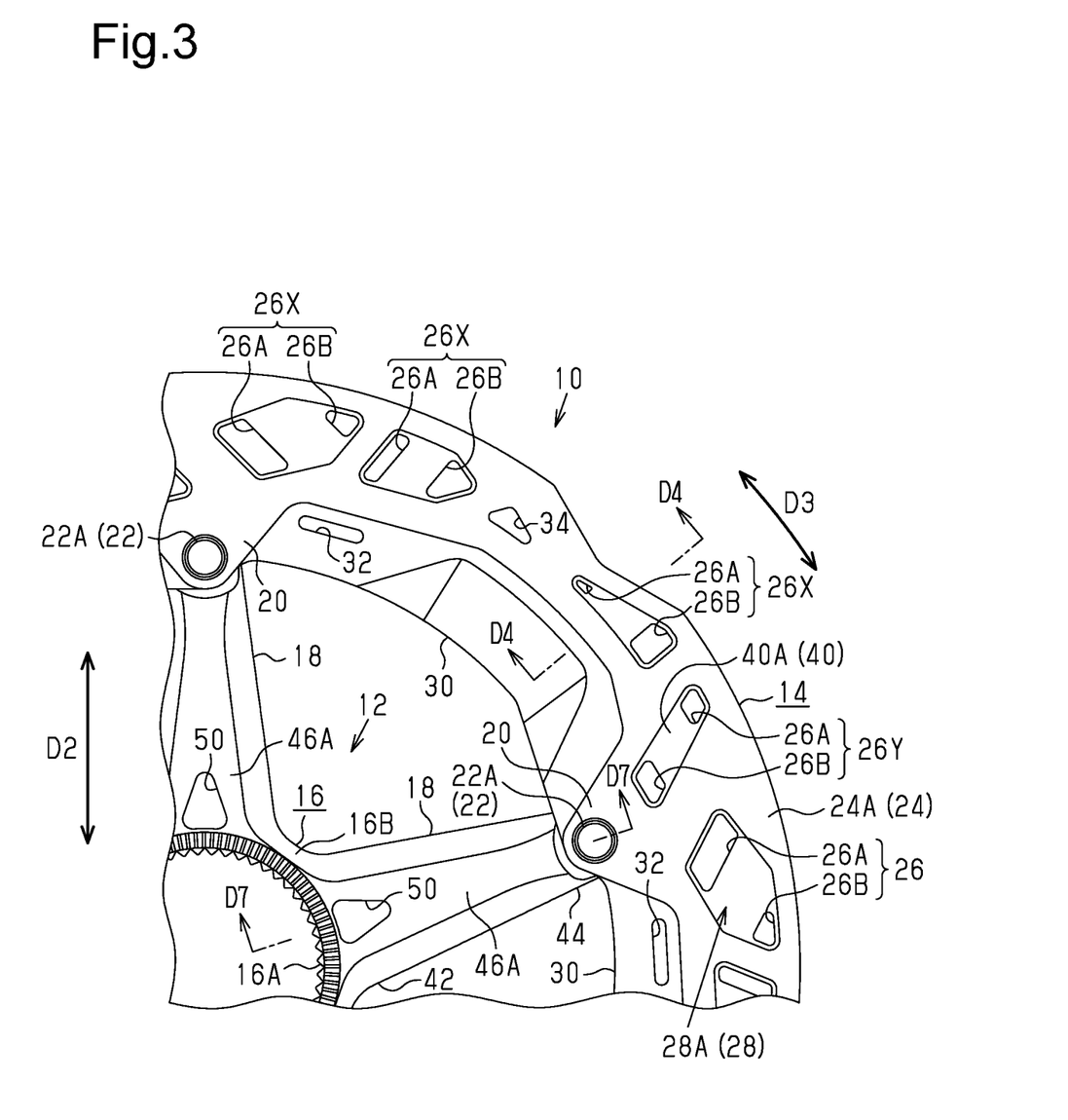
FIG. 3 is a partially enlarged view of the disc brake rotor shown in FIG. 2.

As shown in FIGS. 2 and 3, the disc brake rotor 10 includes an inner member 12 and an outer member 14. The inner member 12 is configured to be attachable to the wheel WF of a small vehicle (here, bicycle). The outer member 14 is outwardly provided with respect to the inner member 12 in a radial direction D2 of the disc brake rotor 10. The inner member 12 includes an attaching portion 16 and a coupling portion 18. The attaching portion 16 is configured to be attachable to the wheel WF. The coupling portion 18 extends toward the outer member 14 in the radial direction D2 to couple the attaching portion 16 and the outer member 14. The attaching portion 16 includes a serration 16A engaged with the wheel WF. The serration 16A is engaged with a corresponding serration (not shown) provided on the wheel WF and restricts movement of the disc brake rotor 10 relative to the wheel WF in a circumferential direction D3.

In this embodiment, the attaching portion 16 is attached by the lock ring L to the wheel WF. The coupling portion 18 is plurally provided on the inner member 12. The coupling portions 18 are provided next to one another in the circumferential direction D3 on an outer circumferential surface 16B of the attaching portion 16. In this embodiment, the number of coupling portions 18 is five.

The outer member 14 is provided as a separate member with respect to the inner member 12. The outer member 14 includes a coupled portion 20 coupled to the coupling portion 18. The coupled portion 20 is plurally provided on the outer member 14 in correspondence with the coupling portions 18. The coupled portions 20 extend toward the inner member 12 in the radial direction D2. In a state where the coupled portions 20 are coupled to the coupling portions 18, the inner member 12 is located toward the wheel WF from the outer member 14. The disc brake rotor 10 further includes fasteners 22 that couple the coupled portions 20 to the coupling portions 18. In this embodiment, the fasteners 22 include rivets 22A. Any member can be used as the fastener 22 as long as it can couple the inner member 12 and the outer member 14. More specifically, bolts may be used instead of the rivets 22A as the fasteners 22.

The outer member 14 includes a brake surface 24, a pair of first through holes 26 extending through the brake surface 24 in the axial direction D1, and a recess 28 provided between at least one of the pair of first through holes 26 in the brake surface 24 so as to be recessed in the axial direction D1. The brake surface 24 includes a first brake surface 24A, facing toward one side in the axial direction D1 (side opposite to wheel WF), and a second brake surface 24B (refer to FIG. 4), facing toward another side in the axial direction D1 (side of wheel WF). Thus, in the brake surface 24, the first brake surface 24A and the second brake surface 24B are faced away from each other in the axial direction D1. The pair of first through holes 26 is plurally provided on the outer member 14. In other words, the outer member 14 includes plural pairs of the first through holes 26.

The pairs of the first through holes 26 each include a first through hole 26A and a first through hole 26B. The pairs of the first through holes 26 are arranged next to one another in the circumferential direction D3. Among the pairs of the first through holes 26, certain pairs of the first through holes 26 (indicated by 26X in FIG. 3) has one first through hole 26A and the other first through hole 26B arranged in the circumferential direction D3. Further, among the first through holes 26, other pairs of the first through holes 26 (indicated by 26Y in FIG. 3) has one first through hole 26A and the other first through hole 26B arranged in the radial direction D2. The recess 28 is provided at least between the first through hole 26A and the first through hole 26B in each pair of the first through holes 26. The recess 28 is provided along an entire periphery of at least one of the first through holes 26 (at least one of first through hole 26A and first through hole 26B). In this embodiment, the recess 28 is provided along the entire periphery of each of one first through hole 26A and the other first through hole 26B in each pair of the first through holes 26. The recess 28 includes a first recess 28A and a second recess 28B (refer to FIG. 4). The first recess 28A is provided to be recessed from the first brake surface 24A in the axial direction D1 (refer to FIG. 4). The second recess 28B is provided to be recessed from the second brake surface 24B in the axial direction D1 (refer to FIG. 4). In each pair of the first through holes 26, one first through hole 26A and the other first through hole 26B are provided so as to be non-line-symmetric via the recess 28. In this embodiment, in each pair of the first through holes 26, one first through hole 26A and the other first through hole 26B differ from each other in shape and size.

The disc brake rotor 10 further includes a heat dissipating fin 30 that is at least partially arranged between adjacent two coupling portions 18 and/or two coupled portions 20 in the circumferential direction D3. The heat dissipating fin 30 is provided inward from the outer member 14 in the radial direction D2. In this embodiment, the heat dissipating fin 30 is provided between adjacent coupled portions 20 in the circumferential direction D3 to entirely connect one coupled portion 20 to the other coupled portion 20. The heat dissipating fin 30 includes a second through hole 32 extending through the heat dissipating fin 30 in the axial direction D1. In this embodiment, the second through hole is shaped to be oblong extending in the circumferential direction D3. The second through hole 32 is provided in the heat dissipating fin 30 so as to be aligned with at least one of the first through hole 26A and the first through hole 26B in the radial direction D2. The second through hole 32 has an opening area that is smaller than that of at least one of the first through holes 26 in each pair (at least one of first through hole 26A and first through hole 26B). In this embodiment, the opening area of the second through hole 32 is smaller than the opening area of one first through hole 26A in each pair of the first through holes 26X (refer to FIG. 3).

As shown in FIG. 2, the outer member 14 further includes a plurality of third through holes 34 extending through the outer member 14 in the axial direction D1. The third through holes 34 are provided so as to be aligned with at least one of the first through hole 26A and the first through hole 26B in the circumferential direction D3. In this embodiment, one of the third through holes 34 is provided for every four pairs of the first through holes 26 in the circumferential direction D3. Each of the third through holes 34 has an opening area that is smaller than that of at least one of the first through holes 26 in each pair (at least one of first through hole 26A and first through hole 26B). In this embodiment, the opening area of each of the third through holes 34 is smaller than the opening area of one of the first through holes 26A in each pair of the first through holes 26X (refer to FIG. 3).

Figure 4:
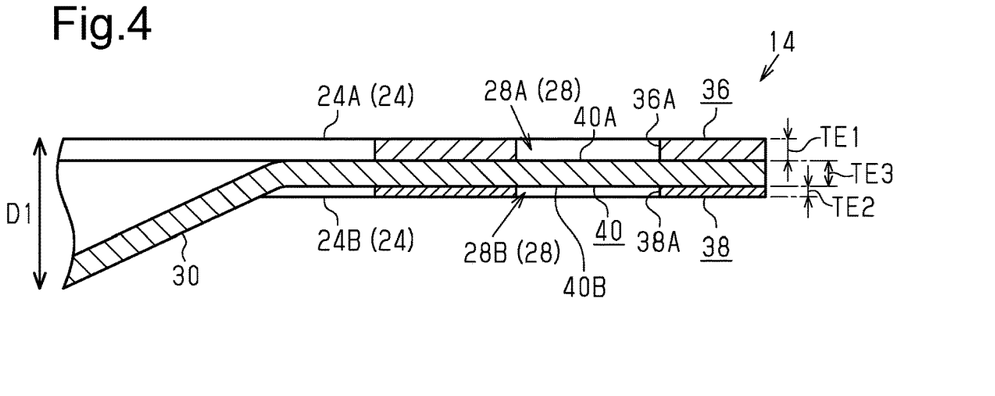
FIG. 4 is a cross-sectional view taken along line D4-D4 in FIG. 3.

As shown in FIG. 4, the outer member 14 includes a first member 36, a second member 38, and an intermediate member 40. The first member 36 includes the first brake surface 24A. The second member 38 includes the second brake surface 24B. The intermediate member 40 is provided between the first member 36 and the second member 38 in the axial direction D1. The first member 36 includes a first material. The second member 38 includes a second material. The intermediate member 40 includes a third material. The first material and the second material are the same. One example of the first material and the second material is stainless steel. The third material differs from the first material and the second material. One example of the third material is an aluminum alloy.

The recess 28 is at least partially configured by the intermediate member 40. The intermediate member 40 includes a first exposed surface 40A and a second exposed surface 40B. Each pair of the first through holes 26 (refer to FIG. 3) is formed to extend through the corresponding first exposed surface 40A and second exposed surface 40B. The first member 36 includes an inner wall surface 36A. The second member 38 includes an inner wall surface 38A. In this embodiment, the first recess 28A is configured by the first exposed surface 40A of the intermediate member 40 and the inner wall surface 36A of the first member 36. More specifically, a bottom portion of the first recess 28A is configured by the first exposed surface 40A of the intermediate member 40, and an inner wall surface of the first recess 28A is configured by the inner wall surface 36A of the first member 36. The second recess 28B is configured by the second exposed surface 40B of the intermediate member 40 and the inner wall surface 38A of the second member 38. More specifically, a bottom portion of the second recess 28B is configured by the second exposed surface 40B of the intermediate member 40, and an inner wall surface of the second recess 28B is configured by the inner wall surface 38A of the second member 38. The heat dissipating fin 30 is at least partially configured by the intermediate member 40. In this embodiment, the heat dissipating fin 30 is entirely formed by the intermediate member 40. That is, in this embodiment, part of the recess 28 and the heat dissipating fin 30 are configured by the intermediate member 40.

Figure 5:
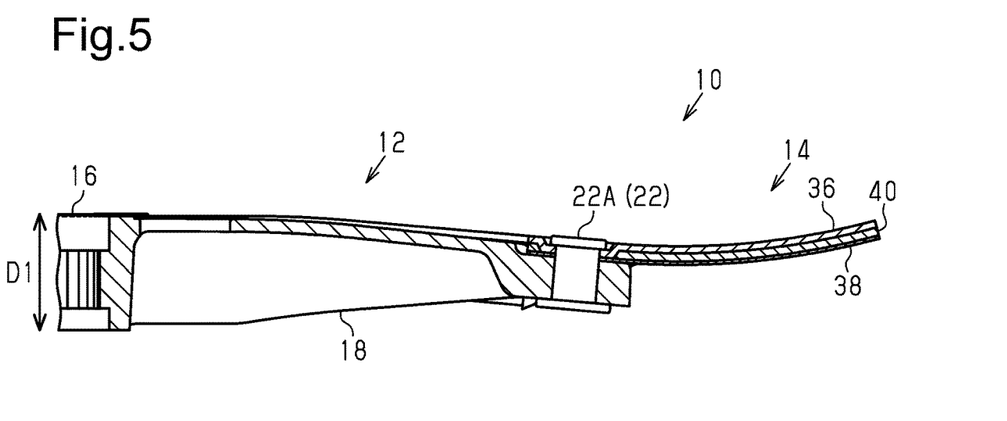
FIG. 5 is a cross-sectional view illustrating the disc brake rotor of FIG. 3 in a displaced state.

FIG. 5 illustrates a state where the disc brake rotor 10 is displaced by the heat generated by the outer member 14. As shown in FIG. 5, the inner member 12 is coupled to the outer member 14 so that heat conduction from the outer member 14 displaces the inner member 12 toward one side in the axial direction D1 (here, toward wheel WF). Contact with the brake pads transmits the heat generated by the outer member 14 to the inner member 12. More specifically, the inner member 12 is coupled to the outer member 14 so that heat conduction from the outer member 14 displaces the coupling portions 18 toward one side in the axial direction D1.

The first member 36 has a first thickness TE1 in the axial direction D1 (refer to FIG. 4). The second member 38 has a second thickness TE2 in the axial direction D1 (refer to FIG. 4). The intermediate member 40 has a third thickness TE3 in the axial direction D1 (refer to FIG. 4). The first thickness TE1 and the second thickness TE2 are set so that the outer member 14 is displaced toward the other side in the axial direction D1 (here, toward side opposite to wheel WF) as the outer member 14 generates heat. In this embodiment, the first thickness TE1 is greater than the second thickness TE2. Thus, the outer member 14 is displaced toward the side opposite to the wheel WF in the axial direction D1 as the outer member 14 generates heat. In this embodiment, the third thickness TE3 is greater than the first thickness TE1 and the second thickness TE2. The first thickness TE1 and the second thickness TE2 of the first member 36 and the second member 38 that are formed from stainless steel and the third thickness TE3 of the intermediate member 40 that is formed from an aluminum alloy are set in this manner to improve the cooling efficiency of the disc brake rotor 10 and reduce the weight of the disc brake rotor 10. Dissipation of the heat generated by the outer member 14 returns the disc brake rotor 10 to its original shape.

The heat generated by the outer member 14 is transmitted to the entire disc brake rotor 10 and dissipated by contact with air. In the outer member 14, the intermediate member 40, which forms the bottom portion of each of the recess 28 (first recesses 28A and second recesses 28B) and does not contact the brake pads, is recessed from the brake surface 24. This increases the surface area of the outer member 14. Thus, the cooling efficiency of the disc brake rotor 10 is improved. Further, the formation of the recesses 28 in the outer member 14 reduces the weight of the outer member 14.

Figure 6:
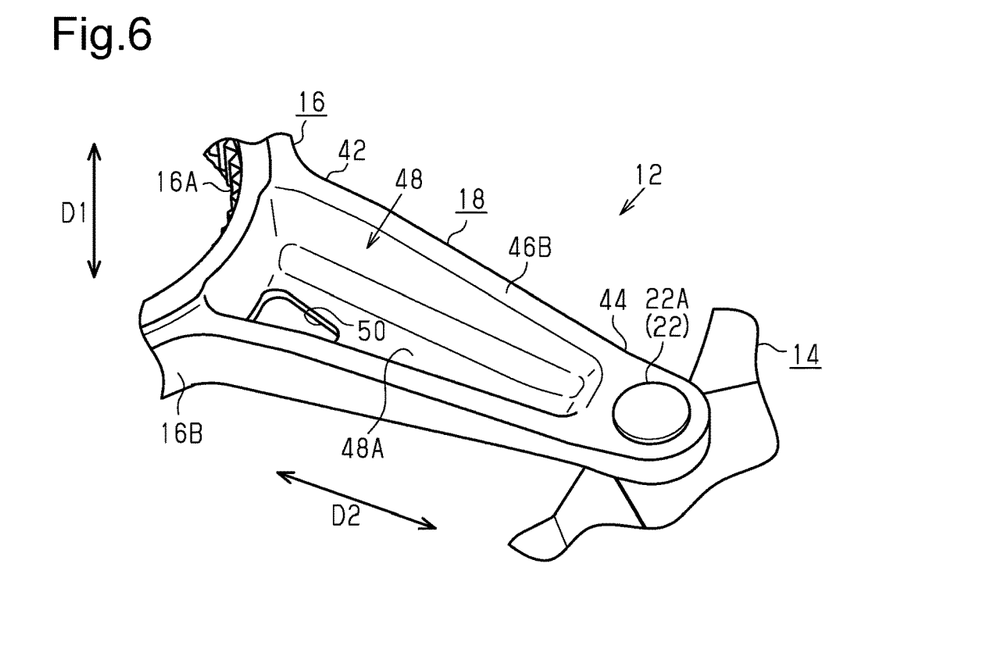
FIG. 6 is a perspective view illustrating a coupling portion of an inner member shown in FIG. 3.

FIG. 6 is a perspective view showing a portion of the inner member 12 at the side of the wheel WF. The coupling portions 18 each include a proximal end portion 42 extending from the attaching portion 16 and a distal end portion 44 located at an opposite side of the proximal end portion 42 in the radial direction D2. In this embodiment, the coupling portions 18 are each shaped to be tapered from the proximal end portion 42 toward the distal end portion 44.

Figure 7:
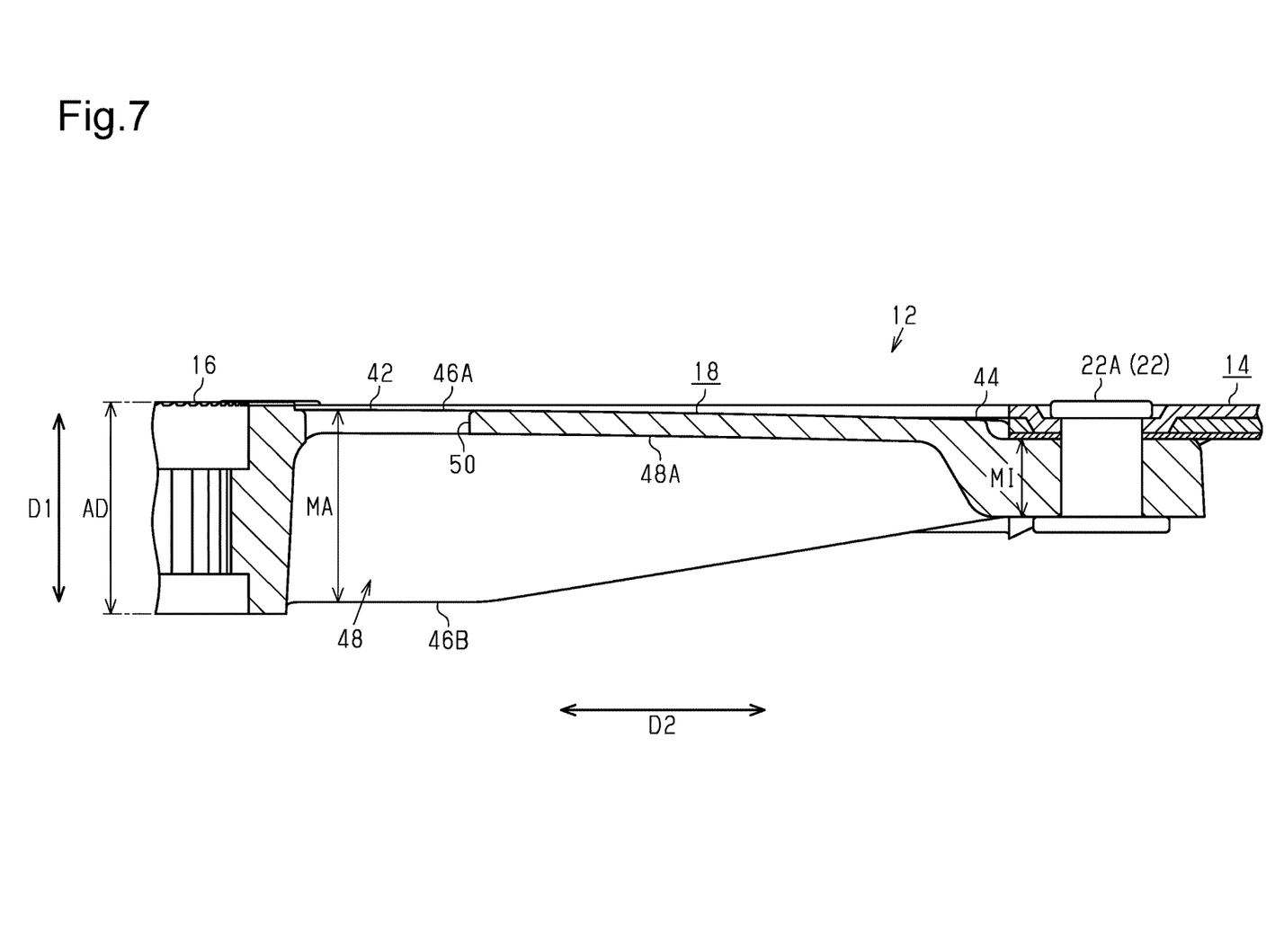
FIG. 7 is a cross-sectional view taken along line D7-D7 in FIG. 3.

The coupling portions 18 each include a first main surface 46A, facing toward one side in the axial direction D1 (side opposite to wheel WF, refer to FIG. 3), and a second main surface 46B, facing toward the other side in the axial direction D1 (side of wheel WF, refer to FIG. 7). The coupling portion 18 includes a recess 48 (arm recess) recessed in the axial direction D1. In this embodiment, the recess 48 is provided in the second main surface 46B. The recess 48 is formed to face toward the wheel WF in a state where the attaching portion 16 is attached to the wheel WF (attached state). The recess 48 includes a through hole 50 extending through the recess 48 in the axial direction D1. In this embodiment, the through hole 50 extends through a bottom surface 48A of the recess 48 in the axial direction D1.

As shown in FIG. 7, the recess 48 is formed so that the depth in the axial direction D1 increases from the outer side toward the inner side in the radial direction D2. The depth of the recess 48 in the axial direction D1 is the distance between the second main surface 46B and the bottom surface 48A in the axial direction D1. The recess 48 can be formed so that the depth in the axial direction D1 decreases from the outer side toward the inner side in the radial direction D2. Further, the coupling portions 18 can each be formed without the recess 48.

The attaching portion 16 has an axial thickness AD in the axial direction D1. Each coupling portion 18 is formed so that the thickness in the axial direction D1 increases from the outer side toward the inner side in the radial direction D2. The thickness of the coupling portion 18 in the axial direction D1 is the distance between the first main surface 46A and the second main surface 46B in the axial direction D1. The coupling portion 18 has a maximum thickness MA in the axial direction D1. The maximum thickness MA is defined at the proximal end portion 42. More specifically, the maximum thickness MA is the thickness in the axial direction D1 of the proximal end portion 42 at the part located closest to the attaching portion 16. The coupling portion 18 further includes a minimum thickness MI in the axial direction D1. The minimum thickness MI is defined at the distal end portion 44. More specifically, the minimum thickness MI is the thickness in the axial direction D1 of the distal end portion 44 at the part coupled to the outer member 14. The coupling portion 18 can be formed so that the thickness in the axial direction D1 decreases from the outer side toward the inner side in the radial direction D2. In this case, the maximum thickness MA is defined at the distal end portion 44, and the minimum thickness MI is defined at the proximal end portion 42.

The ratio of the maximum thickness MA to the axial thickness AD is set to be larger than or equal to 0.7. In a preferred example, the ratio of the maximum thickness MA to the axial thickness AD is set to be larger than or equal to 0.75. The ratio of the maximum thickness MA to the axial thickness AD is set to be smaller than or equal to 0.95. In a preferred example, the ratio of the maximum thickness MA to the axial thickness AD is set to be smaller than or equal to 0.92. The ratio of the minimum thickness MI to the axial thickness AD is set to be larger than or equal to 0.3. In a preferred example, the ratio of the minimum thickness MI to the axial thickness AD is set to be larger than or equal to 0.36. The ratio of the minimum thickness MI to the axial thickness AD is set to be smaller than or equal to 0.4. In a preferred example, the ratio of the minimum thickness MI to the axial thickness AD is set to be smaller than or equal to 0.38.

Second Embodiment

Figure 8:
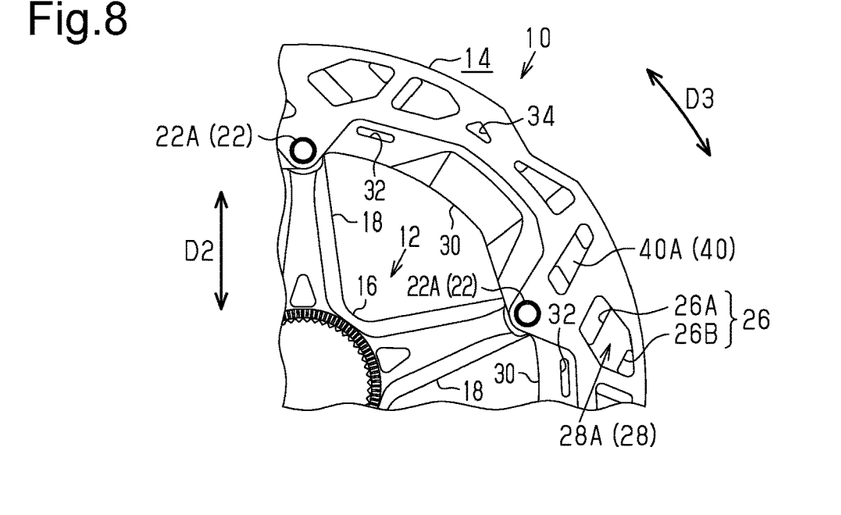
FIG. 8 is a partially enlarged view of a disc brake rotor according to a second embodiment.

A disc brake rotor 10 in accordance with a second embodiment mainly differs from the disc brake rotor 10 in accordance with the first embodiment in the relationship of the pair of first through holes 26 and the recess 28. As shown in FIG. 8, the recess 28 is not provided along the entire periphery of each of one first through hole 26A and the other first through hole 26B in the pair of first through holes 26. In this embodiment, the recess 28 is provided to partition one first through hole 26A from the other first through hole 26B in the pair of first through holes 26. That is, the intermediate member 40 partitions one first through hole 26A from the other first through hole 26B in the pair of first through holes 26.

Third Embodiment

Figure 9:
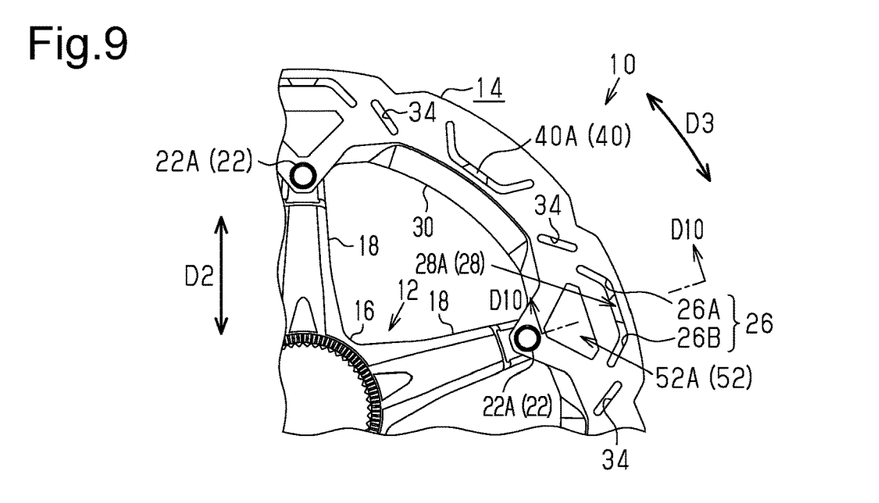
FIG. 9 is a partially enlarged view of a disc brake rotor according to a third embodiment.

A disc brake rotor 10 in accordance with a third embodiment differs from the disc brake rotor 10 in accordance with the second embodiment in the configuration of the outer member 14. As shown in FIG. 9, in the outer member 14, the pairs of the first through holes 26 are provided so as to be aligned in the circumferential direction D3. Each pair of the first through holes 26 is arranged so that one first through hole 26A and the other first through hole 26B are arranged in the circumferential direction D3. In the pair of first through holes 26, one first through hole 26A and the other first through hole 26B are provided so as to be line-symmetric via the recess 28. In this embodiment, in the pair of first through holes 26, one first through hole 26A and the other first through hole 26B are formed to have the same shape and size. The third through holes 34 are provided in the outer member 14 to be aligned with the first through holes 26 in the circumferential direction D3. In this embodiment, the third through holes 34 are provided to be alternately aligned with the pairs of first through holes 26 in the circumferential direction D3. The third through holes 34 have an opening area that is smaller than that of the pairs of first through holes 26.

Figure 10:
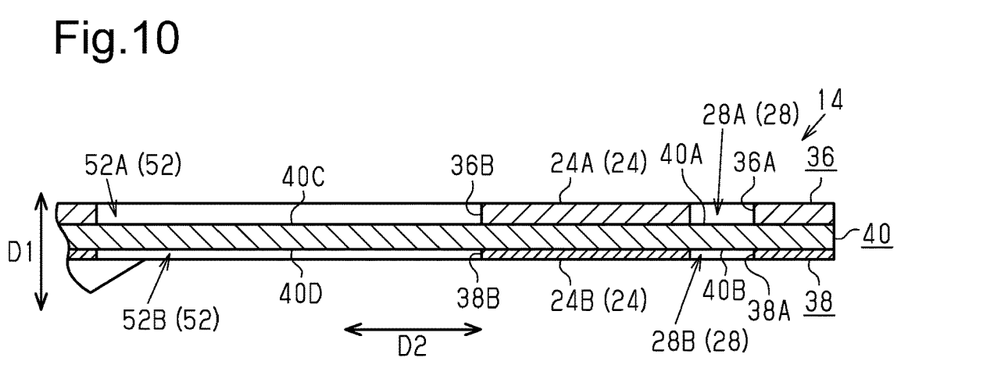
FIG. 10 is a cross-sectional view taken along line D10-D10 in FIG. 9.

The outer member 14 further includes a depression 52 that is recessed in the axial direction D1 from the brake surface 24 and provided in the outer member 14 between each fastener 22 and the first through holes 26. The depression 52 is plurally provided in the outer member 14. As shown in FIG. 10, the depressions 52 include first depressions 52A and second depressions 52B. The first depressions 52A are recessed in the axial direction D1 from the first brake surface 24A. The second depressions 52B are recessed in the axial direction D1 from the second brake surface 24B.

Each depression 52 is at least partially configured by the intermediate member 40. The intermediate member 40 further includes a third exposed surface 40C and a fourth exposed surface 40D. The first member 36 further includes an inner wall surface 36B. The second member 38 further includes an inner wall surface 38B. In this embodiment, the first depression 52A is configured by the third exposed surface 40C of the intermediate member 40 and the inner wall surface 36B of the first member 36. That is, a bottom portion of the first depression 52A is configured by the third exposed surface 40C of the intermediate member 40, and an inner wall surface of the first depression 52A is configured by the inner wall surface 36B of the first member 36. The second depressions 52B is configured by the fourth exposed surface 40D of the intermediate member 40 and the inner wall surface 38B of the second member 38. That is, a bottom portion of the second depression 52B is configured by the fourth exposed surface 40D of the intermediate member 40, and an inner wall surface of the second depression 52B is configured by the inner wall surface 38B of the second member 38. The formation of the depressions 52, in addition to the recesses 28, in the outer member 14 further improves the cooling efficiency of the disc brake rotor 10 and further reduces the weight of the outer member 14. In the disc brake rotor 10 of the third embodiment, the recess 28 can be provided along the entire periphery of at least one of the first through holes 26 in each pair (at least one of first through hole 26A and first through hole 26B).

Modified Examples

The description related with each of the above embodiments exemplifies applicable forms of the disc brake rotor according to the present invention and is not intended to limit the forms. In addition to the embodiments described above, the disc brake rotor according to the present invention is applicable to, for example, modified examples of the above embodiments that are described below and combinations of at least two of the modified examples that do not contradict each other.

The configuration of the recess 28 can be changed in any manner. In a first example, the bottom portion of the recess 28 is configured separately from the intermediate member 40. The bottom portion is joined with the intermediate member 40. The joining means is, for example, welding. The first example increases the degree of freedom for selection of the shape of the bottom portion of the recess 28. In a second example, the bottom portion of the recess 28 is configured by the first member 36. In a third example, the bottom portion of the recess 28 is configured by the second member 38. In a fourth example, one of the first recess 28A and the second recess 28B is omitted from the recesses 28. In a fifth example, the recess 28 includes a plurality of bottom portions. Open space is provided between adjacent ones of the bottom portions. The fifth example forms a flow of air at the bottom portion of the recess 28 from one of the first brake surface 24A and the second brake surface 24B toward the other one of the first brake surface 24A and the second brake surface 24B. In a sixth example, the bottom portion of the recess 28 includes one or more through holes that are separate from the pair of first through holes 26 and extend through the bottom portion in the axial direction D1. The sixth example reduces the weight of the intermediate member 40. In a seventh example, the bottom portion of the recess 28 includes one or more recesses. The recesses are recessed from the surface of the bottom portion so as not to extend through the bottom portion. The seventh embodiment reduces the weight of the intermediate member 40. In an eighth example, the bottom portion of the recess 28 includes one or more projections. The eighth example increases the heat dissipation of the recess 28. In a ninth example, the surface of the bottom portion of the recess 28 is at least partially provided with a curved surface. The curved surface includes at least one of a curved surface projecting outward in the axial direction D1 and a curved surface recessed inward in the axial direction D1. The ninth example increases the heat dissipation of the recess 28. A tenth example includes at least two of the first to ninth examples that can be combined.

The configuration related with the coupling portions 18 can be changed in any manner. In a first example, the coupling portions 18 are configured separately from the inner member 12 and the outer member 14. The inner member 12 includes coupled portions coupled to the coupling portions 18. The outer member 14 includes coupled portions coupled to the coupling portions 18. The coupling portions are coupled to the coupled portions to couple the outer member 14 and the inner member 12. The first example increases the degree of freedom for the shape of the coupling portions 18. In a second example, the coupling portions 18 are included in the outer member 14. The inner member 12 includes coupled portions coupled to the coupling portions 18. The coupling portions 18 of the outer member 14 are coupled to the coupled portions of the inner member 12 to couple the outer member 14 to the inner member 12. In a third example, the number of the coupling portions 18 is any of one to four or any one of six or greater. In a fourth example, among sets of two coupling portions 18 that are adjacent to each other in the circumferential direction D3, the interval between the two coupling portions 18 in one set differs from the interval between the two coupling portions 18 in the other sets.

The configuration related with the heat dissipating fin 30 may be changed in any manner. In a first example, the heat dissipating fin 30 includes a plurality of second through holes 32. The first example reduces the weight of the intermediate member 40. In a second example, the second through holes 32 of the first example are aligned in the circumferential direction D3. In a third example, the second through holes 32 of the first example are aligned in the radial direction D2. In a fourth example, the second through holes 32 of the first embodiment are aligned in an irregular manner. In a fifth example, open space is provided between the heat dissipating fin 30 and the coupled portion 20 in the circumferential direction D3. The fifth example reduces the weight of the intermediate member 40. In a sixth example, the heat dissipating fin 30 does not include the second through hole 32. In a seventh example, the heat dissipating fin 30 is configured by at least one of the first member 36 and the second member 38 instead of or in addition to the intermediate member 40. In an eighth example, the heat dissipating fin 30 is configured as a member separate from the outer member 14.

The relationship of the third thickness TE3, the first thickness TE1, and the second thickness TE2 can be changed in any manner. In a first example, the third thickness TE3 is the same as the first thickness TE1 and the second thickness TE2. In a second example, the third thickness TE3 is less than the first thickness TE1 and the second thickness TE2. In a third example, the third thickness TE3 is less than the first thickness TE1 and greater than the second thickness TE2. In a fourth example, the third thickness TE3 is greater than the first thickness TE1 and less than the second thickness TE2.

The configuration related with the third through holes 34 can be changed in any manner. In one example, the outer member 14 does not include the third through holes 34. This example increases the heat dissipation of the outer member 14.

The configuration of the outer member 14 can be changed in any manner. In a first example, the outer member 14 includes the first member 36 and the second member 38 but does not include the intermediate member 40. In this case, the first member 36 and the second member 38 are directly joined with each other. The joining means is, for example, welding. The first example reduces the weight of the disc brake rotor 10. In a second example, the first member 36 and the second member 38 of the first example are configured integrally with each other. Such an integral configuration differs from the first example in that a joining surface does not exist between the first member 36 and the second member 38 and in that the outer member 14 is configured as a single component including the first member 36 and the second member 38. The second example manufactures the disc brake rotor 10 with fewer steps. In a third example, the first material of the first member 36 differs from the first material of the second member 38. The third example increases the degree of freedom for selection of the properties of the disc brake rotor 10. In a fourth example, the third material of the intermediate member 40 is the same as at least one of the first material and the second material.

The relationship of the inner member 12 and the outer member 14 can be changed in any manner. In a first example, the inner member 12 and the outer member 14 are directly joined with each other. The joining means is, for example, welding. The first example configures the disc brake rotor 10 with fewer components. In a second example, the inner member 12 and the outer member 14 are configured integrally with each other. Such an integral configuration differs from the first example in that a joining surface does not exist between the inner member 12 and the outer member 14 and in that the inner member 12 and the outer member 14 are configured as a single component. The second example manufactures the disc brake rotor 10 with fewer steps.

DESCRIPTION OF REFERENCE CHARACTERS 10) disc brake rotor, 12) inner member, 14) outer member, 18) coupling portion, 20) coupled portion, 22) fastener, 24) brake surface, 24A) first brake surface, 24B) second brake surface, 26) first through hole, 28) recess, 28A) first recess, 26B) second recess, 30) heat dissipation fin, 32) second through hole, 34) third through hole, 36) first member, 38) second member, 40) intermediate member, D1) axial direction, D2) radial direction, D3) circumferential direction, TE1) first thickness, TE2) second thickness, TE3) third thickness, WF) wheel

The invention claimed is:

1. A disc brake rotor for a small vehicle including a bicycle, the disc brake rotor comprising:
   an inner member configured to be coupled to a wheel of the small vehicle; and
   an outer member outwardly provided with respect to the inner member in a radial direction of disc brake rotor,
   wherein the outer member includes a brake surface, a pair of first through holes extending through the brake surface in an axial direction of the disc brake rotor, and a recess provided in the brake surface so as to be recessed in the axial direction at least between and adjacent to the pair of the first through holes.

2. The disc brake rotor according to claim 1, wherein the brake surface includes a first brake surface facing toward one side in the axial direction, and a second brake surface facing toward another side in the axial direction,
   the recess includes a first recess and a second recess,
   the first recess is provided so as to be recessed in the first brake surface in the axial direction, and
   the second recess is provided so as to be recessed in the second brake surface in the axial direction.

3. The disc brake rotor according to claim 2, wherein the outer member includes
   a first member including the first brake surface,
   a second member including the second brake surface, and
   an intermediate member arranged between the first member and the second member in the axial direction.

4. The disc brake rotor according to claim 3, wherein the outer member includes a heat dissipating fin at least partially configured by the intermediate member.

5. The disc brake rotor according to claim 4, wherein the heat dissipating fin includes a second through hole extending through the heat dissipating fin in the axial direction.

6. The disc brake rotor according to claim 5, wherein the second through hole is provided so as to align with the first through hole in the radial direction.

7. The disc brake rotor according to claim 5, wherein the second through hole has an opening area that is smaller than that of at least one of the pair of the first through holes.

8. The disc brake rotor according to claim 3, wherein
   the inner member is coupled to the outer member so that heat conduction from the outer member displaces the inner member toward one side in the axial direction,
   the first member has a first thickness in the axial direction,
   the second member has a second thickness in the axial direction, and
   the first thickness and the second thickness are set so as to displace the outer member toward another side in the axial direction as the outer member generates heat.

9. The disc brake rotor according to claim 8, wherein the first thickness is greater than the second thickness.

10. The disc brake rotor according to claim 8, wherein
    the intermediate member has a third thickness in the axial direction, and
    the third thickness is greater than the first thickness and the second thickness.

11. The disc brake rotor according to claim 3, wherein
    the first member includes a first material,
    the second member includes a second material,
    the intermediate member includes a third material, and
    the third material differs from the first material and the second material.

12. The disc brake rotor according to claim 11, wherein the first material and the second material are the same.

13. The disc brake rotor according to claim 3, wherein the recess is at least partially configured by the intermediate member.

14. The disc brake rotor according to claim 1, wherein
    the inner member includes a coupling portion extending toward the outer member in the radial direction, and
    the outer member includes a coupled portion coupled to the coupling portion.

15. The disc brake rotor according to claim 14, wherein
    the coupling portion is plurally provided on the inner member,
    the coupled portion is plurally provided on the outer member, and
    the disc brake rotor further comprises a heat dissipating fin at least partially arranged between adjacent two of the coupling portions and/or adjacent two of the coupled portions in a circumferential direction of the disc brake rotor.

16. The disc brake rotor according to claim 15, wherein the heat dissipating fin includes a second through hole extending through the heat dissipating fin in the axial direction.

17. The disc brake rotor according to claim 16, wherein the second through hole is provided so as to align with the first through holes in the radial direction.

18. The disc brake rotor according to claim 16, wherein the second through hole has an opening area that is smaller than that of at least one of the pair of the first through holes.

19. The disc brake rotor according to claim 14, wherein the outer member is provided as a separate member with respect to the inner member, and
the disc brake rotor further comprises a fastener coupling the coupled portion to the coupling portion.

20. The disc brake rotor according to claim 1, wherein the outer member further includes a third through hole extending through the outer member in the axial direction.

21. The disc brake rotor according to claim 20, wherein the third through hole is provided so as to align with the first through holes in a circumferential direction of the disc brake rotor.

22. The disc brake rotor according to claim 20, wherein the third through hole has an opening area that is smaller than that of at least one of the pair of the first through holes.

23. The disc brake rotor according to claim 21, wherein the plurality of the pair of the first through holes are provided so as to align with one another in a circumferential direction of the disc brake rotor.

24. The disc brake rotor according to claim 1, wherein the recess is provided along an entire periphery of at least one of the pair of the first through holes.

25. The disc brake rotor according to claim 24, wherein the recess is provided along an entire periphery of each of the pair of the first through holes.

26. The disc brake rotor according to claim 1, wherein the first through holes are arranged in the radial direction.

27. The disc brake rotor according to claim 26, wherein the first through holes are provided so as to be non-line-symmetric via to the recess.

28. The disc brake rotor according to claim 1, wherein the first through holes are arranged in a circumferential direction of the disc brake rotor.

29. The disc brake rotor according to claim 1, wherein the outer member includes a plurality of the pair of the first through holes.

* * * * *